United States Patent [19]

Narula et al.

[11] Patent Number: 5,145,898
[45] Date of Patent: Sep. 8, 1992

[54] AQUEOUS SILIOCONE-ORGANIC HYBRIDS

[75] Inventors: Dipak Narula; Shedric O. Glover; Arthur J. Tselepis, all of Midland, Mich.

[73] Assignee: Dow Corning Corporation, Midland, Mich.

[21] Appl. No.: 608,048

[22] Filed: Oct. 31, 1990

[51] Int. Cl.⁵ .................... C08K 50/07; C09D 183/06; C09K 3/00
[52] U.S. Cl. .................................. 524/310; 524/501; 524/375; 524/376
[58] Field of Search .............. 524/501, 310, 375, 376

[56] References Cited

U.S. PATENT DOCUMENTS

| | | | |
|---|---|---|---|
| 4,423,095 | 12/1983 | Blizzard | 427/387 |
| 4,501,619 | 2/1985 | Gee | 106/287 |
| 4,518,727 | 5/1985 | Traver | 524/35 |
| 4,788,001 | 11/1988 | Narula | 252/312 |
| 4,803,233 | 2/1989 | Narula et al. | 524/58 |
| 4,855,348 | 8/1989 | Strader | 524/317 |
| 4,940,743 | 7/1990 | Grape et al. | 524/377 |

*Primary Examiner*—John C. Bleutge
*Assistant Examiner*—Christopher P. Rogers
*Attorney, Agent, or Firm*—Alexander Weitz

[57] ABSTRACT

The present invention relates to hybrid aqueous silicone-organic composition which are prepared by first forming a silicone oil-in-water emulsion by dispersing an oil phase, containing a silicone polymer and a specific non-ionic surfactant, in a water phase containing a poly(vinyl alcohol) dissolved in water. This silicone emulsion is subsequently mixed with a an aqueous solution of a water-soluble polymer to form the instant compositions which can be applied to substrates to provide coatings having heat resistance comparable to conventional all-silicone systems delivered from organic solvent solution.

18 Claims, No Drawings ns of Rof the present invention.

AQUEOUS SILIOCONE-ORGANIC HYBRIDS

FIELD OF THE INVENTION

The present invention relates to aqueous silicone-organic compositions. In particular, the invention relates to compositions prepared by mixing a water-soluble organic polymer solution with an aqueous emulsion of a silicone polymer which employs emulsifying agents based on specific non-ionic surfactants and a water-soluble organic polymer.

BACKGROUND OF THE INVENTION

Polymeric silicone coatings and, to a lesser extent, silicone-organic coatings, have long been appreciated in the art for their ability to withstand high temperatures and the ravages of harsh climatic environments. The silicone resins have found particular utility in electrical insulation applications, as additives for organic paints and coatings and, when combined with minor portions of a silicone fluid, as excellent release coatings in bakeware applications. Silicone resins have also been successfully added to, e.g., alkyd compositions to improve weather resistance of the latter.

The various silicone resins, even to this day, are generally marketed in solution form despite ever increasing antipollution sentiment throughout the world. Just as in the case of various organic coating formulations, efforts to produce environmentally acceptable silicone resin coating compositions, having properties comparable to those delivered from conventional organic solvents, have met with only limited success to this point. Yet, some inroads toward the environmental goal of reduced volatile organic compounds (VOC) emission have been achieved with the advent of water-based systems. Much of the progress in this area can be attributed to the discovery of various emulsifying agent combinations which provide good, stable emulsions of the silicone resins and fluids in water.

Thus, for example, U.S. Pat. No. 4,501,619 to Gee discloses aqueous emulsions of carboxyl-containing silicone fluids which rely on a surfactant combination consisting of (1) a primary surfactant containing a polyalkylene oxide chain having a lipophilic terminal group; and (2) a cosurfactant selected from fatty acid esters of sorbitol or a polyalkylene chain having a lipophilic terminal group.

Traver, in U.S. Pat. No. 4,518,727, teaches the preparation of water-based silicone resin emulsions which employ a surfactant combination consisting of a cellulosic emulsification agent and an anionic surfactant.

A novel oil-in-water emulsion system, particularly suitable for dispersing silicone oils having a high viscosity, is disclosed by Narula in U.S. Pat. No. 4,788,001, assigned to the assignee of the present invention. In this case, a three-component surfactant combination was shown to be advantageous when each surfactant had a critical, but distinct, hydrophilic/hydrophobic balance (HLB) value.

Emulsions prepared according to the above cited patent to Narula were combined with various aqueous organic polymers to form water-based silicone-organic compositions in U.S. Pat. No. 4,803,233 to Narula and Swihart, assigned to the assignee of the present invention.

Aqueous silicone-containing coating compositions for high temperature appliances were disclosed in U.S. Pat. No. 4,855,348 to Strader. Here, a stable paint was produced from a solid silicone resin and an ammonium salt of a drying oil-modified acrylic copolymer. The paint can be applied to a metal substrate and fired to burn off the acrylic resin and thereby provide a continuous coating capable of withstanding temperatures up to 1,300° F.

Blizzard, in U.S. Pat. No. 4,423,095, discloses silicone-organic coating compositions consisting essentially of a homogeneous mixture of certain silicone resins, one or more silicon-free, film-forming organic polymers and a compatibilizing liquid. The organic polymer can be a water-soluble material, such as poly(vinyl alcohol) or poly(acrylic acid), or water-dispersed material, such as poly(methyl methacrylate) or poly(vinyl acetate). The compatibilizing liquid can be water or an organic liquid, as desired. The silicone resin is said to be the reaction product of a liquid organohydrogenpolysiloxane and a resinous copolymeric siloxane containing silicon-bonded hydroxyl radicals and consisting essentially of $R_3SiO_{1/2}$ units and $SiO_{4/2}$ units.

There are distinct drawbacks to the above described silicone-organic aqueous systems. Although aqueous silicone emulsions taught by Narula represent a significant advancement in the art, the quantity and/or type of emulsifying agents required can severely impair the high temperature stability of coatings formed from these systems, as when combined with organic polymers according to the methods outlined by Narula and Swihart, cited supra. Likewise, the compositions produced by Strader, also cited supra, require the burning off of the acrylic resin contained therein to produce heat resistant coatings.

SUMMARY OF THE INVENTION

The aqueous silicone-organic hybrids of the present invention do not suffer from the above noted drawbacks. The aqueous silicone emulsion component employed in their preparation requires a relatively low quantity of emulsifying agents and the excellent thermal resistance of the resulting silicone-organic coatings is therefore not significantly compromised relative to an all-silicone system which is applied from organic solvent solution.

Copending U.S. Application to Narula et al., Ser. No. 07/606,235, dated Oct. 31, 1990, entitled "Aqueous Silicone Emulsions," describes the preparation of the emulsions comprising the silicone component of the present invention. This copending application is also assigned to the assignee of the present invention and is hereby incorporated by reference. Furthermore, the instant silicone-organic hybrids are stable at ordinary storage temperatures and can allow the use of lower amounts of volatile organic solvents so that some formulations contemplated comply with the standards of the Environmental Protection Agency's (EPA) Rule 24.

The present invention therefore relates to an aqueous silicone-organic hybrid which is prepared by a two-step process. The term "hybrid" as used herein refers to the dual nature of the water-based compositions of the present invention, wherein a silicone emulsion is combined with an aqueous solution of a water-soluble polymer. These hybrids are prepared according to a process comprising:

(A) forming an aqueous silicone emulsion comprising
(I) 100 parts by weight of a silicone polymer;

(II) up to 50 parts by weight of a water-immiscible solvent system;

(III) one non-ionic surfactant selected from the group consisting of (a) sorbitan monoesters of carboxylic acids having 8–12 carbon atoms, (b) polyethylene alkyl ethers having the average formula $$CH_3(CH_2)_m(OCH_2CH_2)_nOH$$

in which m is 7 to 15 and n is 2 to 50, and (c) alkylphenoxy polyethoxy ethanols having the average formula $$C_rH_{2r+1}(C_6H_4)O(CH_2CH_2O)_sCH_2CH_2OH$$

in which r is 4 to 8 and s is 7 to 40;

(IV) poly(vinyl alcohol), the weight ratio of said poly(vinyl alcohol) to said non-ionic surfactant being 0.01 to 10; and (V) at least 10 parts by weight of water, wherein the total content of said non-ionic surfactant (III) and said poly(vinyl alcohol) (IV) is sufficient to produce a uniform dispersion of the components (I) through (IV) in said water component (V), and (B) mixing said aqueous silicone emulsion with an aqueous organic polymer solution comprising (VI) 100 parts by weight of a water-soluble organic polymer;

(VII) up to 15 parts by weight of a water-miscible coalescing solvent; and (VIII) at least 50 parts by weight of water, the weight ratio of said silicone polymer (I) to said water-soluble organic polymer (VI) in said aqueous silicone-organic hibrid being in the range of 15:1 to 1:1.

DETAILED DESCRIPTION OF THE INVENTION

The aqueous silicone-organic hybrids of the present invention are prepared by mixing (A) an aqueous silicone emulsion with (B) a water solution of a water-soluble polymer. The aqueous silicone emulsion, in turn, results when an oil phase, containing (I) a silicone resin or liquid; optionally, (II) a water-immiscible solvent system; and (III) a specific non-ionic surfactant, is thoroughly dispersed in a water phase containing (IV) poly(vinyl alcohol); and (V) water. By the term "oil phase" it is meant herein a liquid or semi-solid material, such as a freely flowing oligomer or a slowly flowing gum, resin or solution thereof.

Component (I) of the present invention is a silicone polymer selected from the group consisting of a silicone resin, a silicone liquid or a combination of these.

A general class of silicone polymers suitable for use as component (I) of the present invention is a compound having at least two silicon atoms per molecule and the average formula $$R_xSiO_{(4-x)/2} \qquad (i)$$

wherein R denotes a hydrocarbon or substituted hydrocarbon radical and the value of x can be in the range of about 1 to 3. These compounds can further comprise various amounts of silicon-bonded radicals, such as hydroxy, alkoxy and hydrogen.

The organic substituent R of formula (i) may be selected from radicals containing one or more atoms selected from the group consisting of nitrogen, oxygen, sulfur, fluorine, chlorine, amido, amino, carboxy, epoxy or mercapto radicals, inter alia. Examples of suitable hydrocarbon radicals include alkyl radicals, such as methyl, ethyl, isopropyl, isobutyl, hexyl, octyl, dodecyl and octadecyl; alkenyl radicals, such as vinyl, allyl and cyclohexenyl; and aryl radicals, such as phenyl, benzyl and tolyl. Examples of suitable substituted hydrocarbon radicals include chloropropyl, 3,3,3-trifluoropropyl, mercaptopropyl, amine-substituted radicals such as beta-aminoethylamine-substituted alkyl radicals and their partially or fully acylated derivatives, epoxy-substituted alkyl radicals such as glycidoxypropyl and carboxyalkyl radicals such as S-carboxymethylmercaptoethyl and its ester derivatives.

One type of silicone resin according to the invention may be represented by the above formula (i) wherein x has a value from 1.0 to 1.9, preferably from 1.3 to 1.7, and contains significant amounts, such as up to 25% by weight, of silicon-bonded hydroxy and/or alkoxy having 1 to 3 carbon atoms, typically methoxy radicals. Said silicon-bonded hydroxy and/or alkoxy radicals are reactive so that the silicone resin can be crosslinked and/or reacted with other components, such as silicone fluids and/or liquid organic resins bearing reactive sites.

Preferred silicone resins comprise copolymers of at least two units selected from the group consisting of $MeSiO_{3/2}$ units, $Me_2SiO_{2/2}$ units, $PhMeSiO_{2/2}$ units, $PhSiO_{3/2}$ units, $Ph_2SiO_{2/2}$ units and $PrSiO_{3/2}$ units. In these formulas, and, hereinafter, Me denotes a methyl radical, Ph denotes a phenyl radical and Pr denotes a propyl radical. The preferred resin copolymers have from about 0.5 to about 6 weight percent residual hydroxyl radicals attached to the silicon atoms thereof, a total molar organic group to silicon ratio of 1 to 1.7 and a total molar phenyl group to silicon ratio of 0.35 to 0.85. It is further preferred that such a resin is combined with up to about 5 percent by weight of a liquid silicone, described infra, to form the silicone polymer (I).

Silicone resins are well known in the art, many being commercially available, and need no detailed delineation herein. Briefly, silicone resins are typically prepared by hydrolyzing one or more hydrolyzable organosilanes and, optionally, "bodying" (i.e., condensing) the hydrolyzate to effect the formation of siloxane linkages. The organic groups of the organosilanes can be any of the hydrocarbon or substituted hydrocarbon radicals delineated above; however, they are typically methyl radicals and mixtures thereof with phenyl radicals. For example the methyl and phenyl radicals can be introduced into the silicone resin as various mixtures of monomethylsiloxy units, dimethylsiloxy units and monophenylsiloxy units. The hydrolyzable radicals of the organosilanes are typically chlorine or methoxy radicals, although other hydrolyzable radicals are sometimes used.

Another type of silicone resin contemplated herein is a resinous copolymeric siloxane which consists essentially of $$R'_3SiO_{1/2} \qquad (ii)$$

siloxane units and $SiO_{4/2}$ siloxane units in a molar ratio which provides from 0.6 to 0.9 $R'_3SiO_{1/2}$ units for every $SiO_{4/2}$ unit. Each R' in formula (ii) independently denotes a monovalent hydrocarbon radical; such as an alkyl radical, such as methyl, ethyl, isopropyl, butyl and hexyl; an alkenyl radical, such as vinyl and allyl; an aryl radical, such as phenyl, tolyl and xylyl; an arylalkyl radical, such as beta-phenylethyl and beta-phenylpropyl; and a cycloaliphatic radical, such as cyclopentyl, and cyclohexyl. Preferably all R' radicals in formula (ii) are lower alkyl radicals, although a minor portion of them can be replaced with other monovalent hydrocarbon radicals such as the vinyl radical and/or the phenyl radical to provide additional properties for the resinous copolymer such as the reactivity attendant therewith. It is preferred that the resinous copolymeric siloxane consists essentially of $(CH_3)_3SiO_{1/2}$ siloxane units and $SiO_{4/2}$ siloxane units in the molar ratio of about 0.75:1. These resins are also well known in the art and may be prepared in an organic solvent by a method outlined by Daudt et al. in U.S. Pat. No. 2,676,182, for example.

Liquid silicone polymers which may be emulsified in water according to the present invention may be linear, branched or cyclic species, also represented by the general formula (i), wherein the value of x is about 1.9 to 3. Preferably, this liquid component is a diorganopolysiloxane homopolymer or copolymer, such as polydimethylsiloxane, polyphenylmethylsiloxane, polytrifluoropropylmethylsiloxane, or copolymers thereof, having a number average molecular weight of about $10^3$ to $10^7$. The terminal groups on the diorganopolysiloxane are not critical and may be illustrated by such groups as trimethylsiloxy, phenyldimethylsiloxy or hydroxydimethylsiloxy. A highly preferred liquid diorganopolysiloxane is hydroxydimethylsiloxy-terminated polydimethylsiloxane having an average molecular weight of 1,000 to 50,000.

The liquid silicone polymers described above are also well known in the art and many are available commercially. In brief, they may be prepared by the hydrolysis and subsequent condensation of the respective chlorosilanes or by the alkaline equilibration of cyclic diorganosiloxanes in the presence of endblocking species.

A water-immiscible solvent system (II) is optionally included in the oil phase of the emulsions of the present invention. When used, this solvent system consists of about 99.5 to about 95 percent by weight of a first organic solvent and about 0.5 to about 5 weight percent of a coalescing solvent. The solvent system is required as an aid to film formation when component (I) is predominantly resinous, but is not necessarily used when (I) is a liquid polymer. The main restrictions on component (II) are that it not be miscible with water (i.e., it forms two phases when mixed therewith), that it be a relatively good solvent for the silicone component used and that it be essentially inert with respect to the other components and therefore not interfere with the respective intended purposes thereof. In addition, the coalescing solvent must have a boiling point considerably greater than that of water, as is well established in the art. Examples of the first solvent include toluene, xylene, mineral spirits and VM&P Naphtha. Examples of the coalescing solvent include alkyl acetates, 2,2,4-trimethylpentanediol 1,3-monoisobutyrate, ethylene glycol monobutyl ether acetate, ethylene glycol monomethyl ether acetate and high-boiling aromatic solvents, among others.

Component (III) is a non-ionic surfactant selected from the specific compounds described infra.

The non-ionic surfactant may be a sorbitan monoesters of a carboxylic acid having 8–12 carbon atoms. Examples of these materials include sorbitan monocaprylate, sorbitan monopelargonate, sorbitan monocaprate, sorbitan monolaurate and sorbitan monomyristate. Preferably this surfactant is sorbitan monolaurate, marketed under the name ARLACEL TM by ICI Americas, Inc., Wilmington, Del.

A second suitable non-ionic surfactant is a polyethylene alkyl ether having the average formula $$CH_3(CH_2)_m(OCH_2CH_2)_nOH$$

in which m is 7 to 15 and n is 2 to 50. Preferred examples of this class include the commercial products BRIJ TM 30 (m=11; n=4) and BRIJ TM 35 (m=11; n=23), both manufactured by ICI Americas, Inc.

A third non-ionic surfactant of the invention is a alkylphenoxy polyethoxy ethanol having the average formula $$C_rH_{2r+1}(C_6H_4)O(CH_2CH_2O)_sCH_2CH_2OH$$

in which r is 4 to 8 and s is 7 to 40. These compounds are commercially available, e.g., from Rohm and Haas (Philadelphia, Pa.) under the trade name TRITON TM. A preferred surfactant of this type is TRITON TM X-100 (r=8 and s=9) manufactured by Rohm and Haas Company, Philadelphia, Pa.

The poly(vinyl alcohol) (IV) of the invention is well known in the art. Preferably, this component is partially hydrolyzed, has a number average molecular weight between about 30,000 and 50,000 and is employed herein as a water solution, as described infra.

The water-soluble polymer (VI) may be any nonionic organic polymer or copolymer which is miscible with water. These materials are well known in the art and have, for example, frequently served as the organic binder component in conventional waterborne paints and coatings. Specific examples of the water-soluble polymers include acrylics, alkyds, urea formaldehydes, epoxy esters, methylated melamines, phenolics, polyamides and polyesters. An extensive enumeration of specific commercial examples of the above systems may be found in the tables provided in Chapter 5 of *Waterborne Coatings* (C. R. Martens, Van Nostrand Reinhold Co., New York, 1981). Additionally, this polymer may comprise carboxy-functional polymers, such as alkyds and acrylics, which have been rendered water-miscible by neutralization with ammonia or an amine, as commonly employed in the art.

It is preferred that the water-soluble polymer is selected from the group consisting of acrylic, polyester or alkyd homopolymer or copolymer which may contain reactive groups capable of providing a means for curing the organic polymer. Most preferably, this component is an acrylic polymer or copolymer.

Component (VII) is a water-miscible coalescing solvent which, in this case, aids in film formation of the water-soluble polymer (VI). It has essentially the same limitations as component (II) with the exception that it is compatible with water. Examples of such solvents include ethylene glycols; alcohols, such as butanol, hexanol and 2-ethylhexanol; glycol ethers, such as ethylene glycol monobutyl ether and ethylene glycol monomethyl ether; and ketones, inter alia.

The compositions of this invention typically comprise additional components to aid in the curing of the silicon polymer (I) and/or the water-soluble organic polymer (VI). Examples of suitable cure-aiding components include well known curing catalysts for silicone polymers, such as compounds of lead, tin, titanium, cobalt, iron, magnesium and zinc.

In addition to the above recited components, the compositions of this invention can further incorporate components such as pigments, fillers, adhesion promoters, antifoams, flow agents, thickeners, biostats, freeze-thaw stabilizers, and odorants which are commonly used in silicone and organic water-based emulsions and, particularly, in emulsions for coating applications. Incorporation of pigments in the various coating formulations is preferred but it has been observed that their addition directly to the silicone emulsion (A) destabilizes the latter and is therefore not recommended.

In order to form the silicone-organic hybrids of the present invention, a two-step process is preferred wherein an aqueous silicone emulsion (A) is first prepared according to the methods described in copending application Ser. No. 07/606,235, cited supra. This silicone emulsion is obtained when an oil phase is prepared by thoroughly mixing 100 by weight of coalescing solvent (II) and the requisite amount of the non-ionic surfactant (III). For the purposes of the present invention, it is preferred that no water-soluble components are added to the oil phase at this point, but any desirable compatible adjuvant may be added thereto. In a similar manner, a water phase is prepared by dissolving the water-soluble polymer (IV) in at least 80 parts by weight of water (V). To this water phase, there may be added any water-soluble component which does not detract from the desired emulsion properties. The total amount of said non-ionic surfactant (III) and said poly(vinyl alcohol) (IV) that is used is the minimum required to produce a stable (i.e., non-separating), uniform emulsion, with the proviso that the weight ratio of said poly(vinyl alcohol) (IV) to said non-ionic surfactant (III) is between about 0.01 and 10, preferably 0.05 to 4. The amount of (III) and (IV) varies with the specific resin or liquid silicone polymer being dispersed and its value may be readily determined by the skilled artisan through routine experimentation. In general, a minimum of about 1.5 parts by weight of the sum of components (III) and (IV) are employed for each 100 parts by weight the silicone polymer (I). When more than about 7.5 parts by weight of (III) and (IV) are so employed, however, no additional emulsion stability is imparted and the excess of these components has been found to detract from the excellent high temperature properties of the silicone polymers.

The silicone emulsions are prepared by mixing the above described water phase with the oil phase to form a silicone oil-in-water emulsion. While it is possible to add the water phase to the oil phase while vigorously stirring the mixture, it is highly preferred to slowly add the oil phase to the water phase while mixing is continued until the mixture becomes an oil-in-water emulsion and the desired size of oil particle is obtained.

Any mixing means can be used in the above described process provided that it is capable of intimately mixing the components of the emulsion to be prepared. Examples of suitable mixing means include, but are not limited to, impeller mixers, mixers having sigma blades or Cowles blades, colloid mills, Sonolator, homogenizer, Micro fluidizer and planetary mixers.

The oil-in-water silicone emulsions prepared according to the above described methods may be diluted with additional water, the amount of which is not narrowly limited provided a stable emulsion is maintained. For example, from about 10 to 1,900 parts by weight of water for every 100 parts by weight of the silicone polymer can be used. However, emulsions which are rich in water require longer periods of mixing than emulsions which are rich in water-insoluble oil. Consequently the amount of water to be used in this invention to form the emulsion is preferably limited to less than 350 parts by weight, and most preferably less than 100 parts by weight, per 100 parts by weight of the silicone polymer. The water that is used in this invention is preferably deionized or distilled.

The above described silicone emulsion (A) is then thoroughly mixed with an aqueous organic polymer solution (B) of the present invention. The latter is prepared by thoroughly mixing 100 parts by weight of the water-soluble organic polymer (VI), up to about 15 parts by weight of the coalescing solvent (VII) and at least 50 parts by weight of water using any of the above mentioned mixing means. When pigments are incorporated in the compositions of the present invention, they are dispersed in the aqueous organic polymer solution (B). It is contemplated that the weight ratio of the silicone polymer (I) to the water-soluble organic polymer (VI) in the final silicone-organic hybrid composition is between about 15:1 and 1:1, preferably between 13:1 and 5:1.

It has been found that when components (I) through (VIII) are combined and mixed in a one-step process, a stable silicone-organic emulsion is not readily obtained, particularly in the presence of pigments. Therefore, the above described two-step process is necessary in order to be within the scope of the present invention.

The compositions prepared according to this invention are expected to have the same utility as other water-based silicone, or silicone-organic, oil-in-water systems of the art, such as for coating applications including coil coatings, automotive coatings, industrial and marine maintanance coatings and antifouling coatings. They are particularly suitable for the preparation of high temperature resistant and corrosion resistant coatings and paints. Moreover, when silicone polymer (I) is a silicone resin combined with up to about 5 weight percent of a silicone fluid, such as polydimethylsiloxane, the compositions of the present invention produce excellent coatings for bakeware applications.

EXAMPLES

The following examples are presented to further illustrate the compositions of this invention, but are not to be construed as limiting the invention, which is delineated in the appended claims. All parts and percentages in the examples are on a weight, unless indicated to the contrary.

The following materials, listed alphabetically for ease of reference, were employed in the preparation of the illustrative examples.

AIRVOL TM 205 is a partially hydrolyzed poly(vinyl alcohol) having a molecular weight in the range of about 30,000 to 50,000 and marketed by Air Products (Allentown, Pa.).

ARLACEL TM 20 is sorbitan monolaurate having an HLB (hydrophilic/hydrophobic balance) of 8.6 and marketed by ICI Americas, Inc. (Wilmington, Del.).

BK 4799 is black iron oxide powder from Pfizer Inc. (New York, N.Y.).

CYMEL TM 1156 is a butylated melamine resin marketed by American Cyanamide Co. (Wayne, N.J.).

DOWANOL™ PM is propylene glycol methyl ether obtained from the Dow Chemical Co. (Midland, Minn.).

EXXATE™ 900 is a solvent consisting essentially of nonyl acetate obtained from Exxon Chemicals (Houston, Tex.).

FLUID 1 is a hydroxyl endblocked polydimethylsiloxane having the average formula

$HOMe_2SiO(Me_2SiO)_{540}H$ wherein Me hereinafter denotes a methyl radical.

GEL WHITE™ is a clay rheology control agent marketed by EEC America (Gonzales, Tex.).

JONCRYL™ 61 is an aqueous acrylic resin solution consisting essentially of 35% acrylic resin, 7.5% ammonium hydroxide, 1.5% ethylene glycol, 5.0% isopropyl alcohol and 51% water and having a pH of 8.3-8.6; it is marketed by Johnson Wax (Racine, Wis.).

MEARLIN SUPER SPARKLE™ is a mica-treated titanium dioxide pigment marketed by Mearl Pigment Co. (New York, N.Y.).

R-960 is a titanium dioxide pigment marketed by E. I. Du Pont (Wilmington, Del.).

RESIN 1 is a solid, hydroxyl functional organosiloxane resin copolymer consisting essentially of $MeSiO_{3/2}$ units, $PhMeSiO_{2/2}$ units, $PhSiO_{3/2}$ units and $Ph_2SiO_{2/2}$ units, in a molar ratio of 45:5:40:10, in which Me hereinafter denotes a methyl radical and Ph hereinafter denotes a phenyl radical, and having a hydroxyl content of about 5%.

RESIN 2 is an 80% toluene solution of a hydroxyl functional organosiloxane resin copolymer consisting essentially of $MeSiO_{3/2}$ units, $Me_2SiO_{2/2}$ units, $PhSiO_{3/2}$ units and $Ph_2SiO_{2/2}$ units in a molar ratio of 25:20:35:20 and having a hydroxyl content of approximately 3%.

RESIN 3 is an 50% (in 1:1 xylene:toluene) solution of a hydroxyl functional organosiloxane resin copolymer consisting essentially of $MeSiO_{3/2}$ units, $Me_2SiO_{2/2}$ units, $PhSiO_{3/2}$ units and $Ph_2SiO_{2/2}$ units in a molar ratio of 25:19:37:19 and having a hydroxyl content of approximately 0.5%.

RESIN 4 is a blend consisting of 70% of said RESIN 2 and 30% of said RESIN 3.

SC 150 is an aromatic solvent having a boiling point of about 362° F. obtained from Chem Central (Chicago, Ill.).

EXAMPLE 1

An oil phase, consisting of 28.6 parts of RESIN 1, 6.6 parts of SC 150 solvent, 1.3 parts of EXXATE™ 900 solvent, 1.8 parts of ARLACEL™ 20 and 1.8 parts of FLUID 1, was prepared by thoroughly mixing these ingredients. A total of 21 parts of this oil phase was added to 3 parts of a 2.5% water solution of AIRVOL™ 205 in a Myers mixer over a period of about 22 minutes. Agitation was provided by a Cowles blade operating at 835 rpm and an anchor blade operating at 83 rpm, this agitation being continued for an additional ten minutes. The emulsion so formed was mixed for an additional 20 minutes (Cowles blade at 2,577 rpm; anchor blade at 142 rpm), whereupon 4 parts of dilution water was added to form a stable oil-in-water emulsion.

EXAMPLES 2-5

Paint "grinds" shown in Table 1 were prepared by mixing the ingredients on an Eiger mill at 2,000 rpm to obtain suspensions having a value of 8 on the Hegman gage. Each of these grinds was then mixed with 100 part portions of the silicone resin emulsion prepared in Example 1 to provide stable, water-based, silicone-organic coating compositions. Each composition was reduced to 45% non-volatile content with deionized water, sprayed onto aluminum panels, air dried for 20 minutes at room temperature and then cured at 600° F. for 5 minutes.

TABLE 1

| Grind Component | Example 2 | Example 3 | Example 4 | Example 5 |
|---|---|---|---|---|
| JONCRYL™ 61 | 9.35 | 9.35 | 9.35 | 9.35 |
| Deionized Water | 2.47 | 6.65 | 12.99 | 23.21 |
| BK 4799 | 5.12 | 10.33 | 18.71 | 32.07 |
| MEARLIN SUPER SPARKLE™ | 0.82 | 1.68 | 3.04 | 5.21 |
| GEL WHITE™ | 0.17 | 0.34 | 0.62 | 1.06 |
| Silicone Antifoam | 0.08 | 0.08 | 0.08 | 0.08 |
| DOWANOL™ PM | 0.33 | 0.79 | 1.54 | 2.60 |
| CYMEL™ 1156 | 1.36 | 1.36 | 1.36 | 1.36 |
| DBSA* | 0.30 | 0.30 | 0.30 | 0.30 |

*DBSA = Dodecyl benzene sulfonic acid (10% in DOWANOL™ PM).

All the cured coatings of Examples 2-5 were subjected to the following tests, the results of which are presented in Table 2, below.

Pencil Hardness

The hardest pencil which does not cut through the cured film surface, per ASTM D3363.

Detergent Resistance

In this method, the rounded end of a one-pound ball-peen hammer was wrapped with eight layers of cotton gauze and the gauze soaked in SOFT SCRUB™ (Clorox Company, Oakland, Calif.). The weighted gauze is dragged, back and forth (i.e., double rubs) across the coating surface 200 times, failure being indicated by visible scarring of the coating or penetration thereof.

Crosshatch Adhesion Test

Above cited U.S. Pat. No. 4,803,233 to Narula and Swihart is hereby incorporated by reference to instruct those skilled in the art in this well known procedure.

Food Release/Stain Resistance

This is determined by placing a 10 gram portion of a barbecue sauce on a coated panel and heating the combination at 350° F. for 30 minutes. After cooling to room temperature, the cooked material is scraped with a plastic spatula and the ease of release as well as any staining noted (scale of 1 to 5 wherein 1=extreme sticking; extreme staining and 5=no sticking and no staining). After cleaning with a damp cloth, the procedure is repeated until the food either sticks to the coating or a maximum of 3 cycles is attained.

Steam Resistance

In this procedure, the surface of a coated panel is directly exposed to steam for 20 and 40 minutes and the coating inspected for color changes, cloudiness or loss of adhesion, any of which being deemed an indication of failure.

TABLE 2

| Test Method | Example 2 | Example 3 | Example 4 | Example 5 |
|---|---|---|---|---|
| Pencil Hardness | 2B | B | B | B |
| Detergent Resistance (Double Rubs) | 120 | 150 | 145 | 100 |
| Crosshatch Adhesion Test | 100% | 100% | 100% | 100% |
| Food Release/Stain Resistance | | | | |
| First Cycle | 5/4 | 5/5 | 5/4 | 5/5 |
| Second Cycle | 5/4 | 5/5 | 5/4 | 5/5 |
| Third Cycle | 4/3 | 4/4 | 4/3 | 5/5 |
| Steam Resistance | | | | |
| 20 Minutes | Pass | Pass | Pass | Pass |
| 40 Minutes | Pass | Pass | Pass | Pass |

EXAMPLE 6

To 50.0 grams of RESIN 4 there was added 1.0 grams of ARLACEL TM 20 to form a homogeneous oil phase. The oil phase was then added to 10.0 grams of a 2.5% aqueous solution of AIRVOL TM 205 while stirring with a Cowles blade at 2,000 rpm. After all the oil phase was added, the mixing was continued for an additional five minutes at 5,000 rpm, whereupon dilution water (16.9 grams) was mixed in to result in a stable oil-in-water emulsion.

Twenty parts of the above emulsion were blended with 20 parts of the first grind composition shown in Table 3. The grind composition was mixed on a Cowles blade mixer at 3,500 rpm/15 minutes. The result was a stable silicone-organic emulsion. A coating of the latter emulsion was cured on a substrate at room temperature/30 minutes, as well as at 450° F./30 minutes, to provide a good, hard film having no defects, such as blisters or fisheyes.

TABLE 3

| Grind Component | Example 6 | Example 7 |
|---|---|---|
| JONCRYL TM 61 | 12.8 | 60.0 |
| Deionized Water | 18.75 | 11.5 |
| R-960 | 45.2 | 15.0 |
| MEARLIN SUPER SPARKLE TM | — | 3.0 |
| GEL WHITE TM | 0.2 | 0.4 |
| Silicone antifoam | 0.1 | 0.2 |
| DOWANOL TM PM | 3.0 | 1.2 |
| CYMEL TM 1156 | 2.0 | 6.3 |
| DBSA* | 0.1 | 2.4 |

*DBSA = Dodecyl benzene sulfonic acid (20% in DOWANOL TM PM).

EXAMPLE 7

A silicone emulsion was prepared according to the methods described in Example 1, wherein the oil phase consisted of 54.8 parts of RESIN 1, 12.5 parts of SC 150 solvent, 2.5 parts of EXXATE TM 900, 3.4 parts of ARLACEL TM 20 and 3.4 parts of FLUID 1. The water phase consisted of 11.4 parts of a 2.5% aqueous solution of AIRVOL TM 205. After dispersing the oil phase in the water phase, an additional 12.0 parts of water were added to form a silicone emulsion. The second grind composition shown in Table 3 was mixed with the above silicone emulsion in a ratio of 16.7 to 83.3, respectively, to form a coating composition which was applied to steel and aluminum substrates and cured thereon at 600° F./5 minutes. The cured films passed the above mentioned crosshatch adhesion (i.e., 100% adhesion), food release/stain resistance and steam resistance tests and were additionally subjected to the following tests.

Water Soak Resistance

Determined by soaking test panels in water for 24 hours. The coatings are then inspected for visible changes, as in the above described steam resistance test.

Heat Resistance

Evaluated by heating the coated panel to 550° F. for one hour, cooling to room temperature and inspecting the coating. Failure is indicated by a change in appearance, loss of adhesion or cracking. This procedure is repeated at 50° F. increments up to 700° F. Exposure for a period of two hours at the latter temperature without a visible effect indicates a passing condition.

The results obtained on the silicone-organic coating of Example 7 were at least as good as those observed for coatings based on a comparable all-silicone resin, applied from organic solvent solution. These results indicate that the modification of the silicone resin with an organic polymer, according to the methods of the present invention, does not detract from the former's excellent heat resistance properties.

We claim:

1. An aqueous silicone-organic composition prepared by a two-step process consisting essentially of:
   (A) forming an aqueous silicone emulsion consisting essentially of
      (I) 100 parts by weight of a silicone resin;
      (II) up to 50 parts by weight of a water-immiscible solvent system;
      (III) one non-ionic surfactant selected from the group consisting of
         (a) sorbitan monoesters of carboxylic acids having 8–12 carbon atoms,
         (b) polyethylene alkyl ethers having the formula

in which m is 7 to 15 and n is 2 to 50, and
         (c) alkylphenoxy polyethoxy ethanols having the formula

in which r is 4 to 8 and s is 7 to 40;
      (IV) poly(vinyl alcohol), the weight ratio of said poly(vinyl alcohol) (IV) to said non-ionic surfactant (III) being 0.01 to 10; and
      (V) at least 10 parts by weight of water, wherein the total content of said non-ionic surfactant (III) and said poly(vinyl alcohol) (IV) is sufficient to produce a uniform oil-in-water dispersion of components (I) through (IV), and wherein said silicone resin (I) comprises at least two units selected from the group consisting of MeSiO$_{3/2}$ units, Me$_2$SiO$_{2/2}$ units, PhMeSiO$_{2/2}$ units, PhSiO$_{3/2}$ units, Ph$_2$SiO$_{2/2}$ units and PrSiO$_{3/2}$ units, in which Me denotes a methyl radical, Ph denotes a phenyl radical and Pr denotes a propyl radical, and said silicone resin contains up to 25% by weight of silicon-bonded moieties selected from the group consisting of hydroxyl groups and alkoxy groups having 1 to 3 carbon atoms, and
   (B) mixing said aqueous silicone emulsion with an aqueous organic polymer solution comprising (VI) 100 parts by weight of a water-soluble organic polymer;

(VII) up to 15 parts by weight of a water-miscible coalescing solvent; and (VIII) at least 50 parts by weight of water, the weight ratio of said silicone polymer (I) to said water-soluble organic polymer (VI) in said aqueous silicone-organic composition being in the range of 15:1 to 1:1.

2. The composition to claim 1, wherein said resin has 0.5 to 6 weight percent residual hydroxyl radicals attached to the silicon atoms thereof, a total molar organic group to silicon ratio of 1 to 1.7 and a total molar phenyl group to silicon ratio of 0.35 to 0.85.

3. The composition according to claim 2, wherein said non-ionic surfactant (III) is selected from the group consisting of sorbitan monolaurate, a polyethylene alkyl ether having the average formula $$CH_3(CH_2)_m(OCH_2CH_2)_nOH$$

in which m is 7 and n is 4 to 23, and an alkylphenoxy polyethoxy ethanol having the average formula $$C_rH_{2r+1}(C_6H_4)O(CH_2CH_2O)_sCH_2CH_2OH$$

in which r is 8 and s is 9.

4. The composition according to claim 3, wherein the weight ratio of said poly(vinyl alcohol) (IV) to said non-ionic surfactant (III) is 0.05 to 4.

5. The composition according to claim 4, wherein said silicone polymer (I) further comprises up to 5 weight percent of a polydimethylsiloxane liquid.

6. The composition according to claim 1, wherein said water-soluble polymer (VI) is selected from the group consisting of acrylic, polyester and alkyd polymers and copolymers.

7. The composition according to claim 2, wherein said water-soluble polymer (VI) is selected from the group consisting of acrylic, polyester and alkyd polymers and copolymers.

8. The composition according to claim 3, wherein said water-soluble polymer (VI) is selected from the group consisting of acrylic, polyester and alkyd polymers and copolymers.

9. The composition according to claim 5, wherein said water-soluble polymer (VI) is an acrylic polymer or copolymer.

10. The composition according to claim 1, wherein said water-soluble polymer (VI) is selected from the group consisting of acrylic, polyester and alkyd polymers and copolymers.

11. The composition according to claim 1, wherein said non-ionic surfactant (III) is selected from the group consisting of sorbitan monolaurate, a polyethylene alkyl ether having the average formula $$CH_3(CH_2)_m(OCH_2CH_2)_nOH$$

in which m is 7 and n is 4 to 23, and an alkylphenoxy polyethoxy ethanol having the average formula $$C_rH_{2r+1}(C_6H_4)O(CH_2CH_2O)_sCH_2CH_2OH$$

in which r is 8 and s is 9.

12. The composition according to claim 11, wherein said water-soluble polymer (VI) is selected from the group consisting of acrylic, polyester and alkyd polymers and copolymers.

13. The composition according to claim 1, wherein said non-ionic surfactant (III) is sorbitan monolaurate.

14. The composition according to claim 2, wherein said non-ionic surfactant (III) is sorbitan monolaurate.

15. The composition according to claim 10, wherein said non-ionic surfactant (III) is sorbitan monolaurate.

16. An aqueous silicone-organic composition prepared by a two-step process comprising:

(A) forming an aqueous silicone emulsion consisting essentially of (I) 100 parts by weight of a liquid silicone polymer selected from the group consisting of polydimethylsiloxane, polyphenylmethylsiloxane, polytrifluoropropylmethylsiloxane and copolymers thereof;

(II) up to 50 parts by weight of a water-immiscible solvent system;

(III) a non-ionic surfactant selected from the group consisting of (a) sorbitan monoesters of carboxylic acids having 8–12 carbon atoms, (b) polyethylene alkyl ethers having the formula $$CH_3(CH_2)_m(OCH_2CH_2)_nOH$$

in which m is 7 to 15 and n is 2 to 50, and (c) alkylphenoxy polyethoxy ethanols having the formula $$C_rH_{2r+1}(C_6H_4)O(CH_2CH_2O)_sCH_2CH_2OH$$

in which r is 4 to 8 and s is 7 to 40;

(IV) poly(vinyl alcohol), the weight ratio of said poly(vinyl alcohol) (IV) to said non-ionic surfactant (III) being 0.01 to 10; and (V) at least 10 parts by weight of water, wherein the total content of said non-ionic surfactant (III) and said poly(vinyl alcohol) (IV) is sufficient to produce a uniform oil-in-water dispersion of components (I) through (IV), and (B) mixing said aqueous silicone emulsion with an aqueous organic polymer solution comprising (VI) 100 parts by weight of a water-soluble organic polymer;

(VII) up to 15 parts by weight of a water-miscible coalescing solvent; and (VIII) at least 50 parts by weight of water, the weight ratio of said silicone polymer (I) to said water-soluble organic polymer (VI) in said aqueous silicone-organic composition being in the range of 15:1 to 1:1.

17. The composition according to claim 16, wherein said liquid silicone polymer is polydimethylsiloxane.

18. The composition according to claim 17, wherein said surfactant (III) is sorbitan monolaurate.

* * * * *